(12) United States Patent
Castorina et al.

(10) Patent No.: US 12,277,063 B1
(45) Date of Patent: Apr. 15, 2025

(54) BYPASSING PROGRAM COUNTER MATCH CONDITIONS

(71) Applicant: Arm Limited, Cambridge (GB)

(72) Inventors: Ugo Castorina, Antibes (FR); Damien Matthieu Valentin Cathrine, Mougins (FR); Marco Coletta, Antibes (FR); Diogo Augusto Pereira Marques, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/538,160

(22) Filed: Dec. 13, 2023

(51) Int. Cl.
*G06F 12/0862* (2016.01)

(52) U.S. Cl.
CPC .. *G06F 12/0862* (2013.01); *G06F 2212/1021* (2013.01)

(58) Field of Classification Search
CPC ......... G06F 12/0862; G06F 2212/1021; G06F 9/30047; G06F 9/321; G06F 12/0238; G06F 12/0871; G06F 12/121; G06F 18/214; G06F 9/3802; G06F 9/3832; G06F 2212/1028; G06F 2212/6028; G06F 12/127; G06F 2212/1024; G06F 2212/6024
See application file for complete search history.

(56) References Cited

U.S. PATENT DOCUMENTS

| | | | | |
|---|---|---|---|---|
| 5,438,670 | A * | 8/1995 | Baror | G06F 12/1054 712/E9.055 |
| 11,675,702 | B1 * | 6/2023 | Castorina | G06F 9/3832 711/118 |
| 2016/0098349 | A1 * | 4/2016 | Watahiki | G06F 12/0862 711/137 |
| 2018/0329822 | A1 * | 11/2018 | Brekelbaum | G06F 9/30043 |
| 2021/0357228 | A1 * | 11/2021 | Shulyak | G06F 9/3832 |
| 2023/0297381 | A1 * | 9/2023 | Keltcher | G06F 9/3844 712/240 |

* cited by examiner

*Primary Examiner* — Michael Krofcheck
(74) *Attorney, Agent, or Firm* — NIXON & VANDERHYE P.C.

(57) ABSTRACT

An apparatus for improving the tracking of streams of memory accesses for training a stride prefetcher is provided, comprising a training data structure storing entries for training a stride prefetcher, a given entry specifying: a stride offset, a target address, a program counter address, and a bypass indicator indicating whether a program counter match condition is to be bypassed for the given entry; and training control circuitry to determine whether to update the stride offset for the given entry of the training data structure to specify a current stride between a target address of a current memory access and the target address for the last memory access of the tracked stream, in which the determination by the training control circuitry is controlled to be either dependent on a determination of whether the program counter match condition is satisfied or independent of whether the program counter match condition is satisfied, based on the bypass indicator.

19 Claims, 12 Drawing Sheets

BYPASSING PROGRAM COUNTER MATCH CONDITIONS

BACKGROUND

Technical Field

The present technique relates to the field of data processing and in particular to training a prefetcher.

Technical Background

A data processing apparatus may be provided with a prefetcher to issue requests to fetch a piece of data from memory before an instruction explicitly requesting that piece of data is encountered. The prefetcher may form predictions of what memory addresses are to be accessed based on training data collected according to previous memory accesses.

SUMMARY

At least some examples of the present technique provide an apparatus comprising: a training data structure to store a plurality of entries for training a stride prefetcher, a given entry specifying: a stride offset for a corresponding tracked stream of memory accesses, a target address and a program counter address for a last memory access encountered for the corresponding tracked stream, and a bypass indicator indicating whether a program counter match condition is to be bypassed for the given entry; and training control circuitry to determine whether to update the stride offset for the given entry of the training data structure to specify a current stride between a target address of a current memory access and the target address for the last memory access of the corresponding tracked stream, wherein: in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and in response to the bypass indicator indicating that the program counter match condition is to be bypassed for the given entry, the training control circuitry is configured to determine whether to update the stride offset of the given entry to specify the current stride independent of whether the program counter match condition is satisfied.

At least some examples of the present technique provide a system comprising: an apparatus described above; at least one board system component; and a board, wherein the at least one packaged chip and the at least one system component are assembled on the board.

At least some examples of the present technique provide a chip-containing product comprising the system described above, assembled on a further board with at least one other product component.

At least some examples of the present technique provide a method comprising: storing a plurality of entries for training a stride prefetcher, a given entry specifying: a stride offset for a corresponding tracked stream of memory accesses, a target address and a program counter address for a last memory access encountered for the corresponding tracked stream, and a bypass indicator indicating whether a program counter match condition is to be bypassed for the given entry; and determining whether to update the stride offset for the given entry to specify a current stride between a target address of a current memory access and the target address for the last memory access of the corresponding tracked stream, wherein: in response to the bypass indicator indicating that the program counter match condition is not to be bypassed for the given entry, determining whether to update the stride offset of the given entry to specify the current stride depending on a determination of whether the program counter address for the last memory access and a program counter address for the current memory access satisfy the program counter match condition; and in response to the bypass indicator indicating that the program counter match condition is to be bypassed for the given entry, determining whether to update the stride offset of the given entry to specify the current stride independent of whether the program counter match condition is satisfied.

At least some examples of the present technique provide a non-transitory computer-readable medium to store computer-readable code for fabrication of an apparatus comprising: a training data structure to store a plurality of entries for training a stride prefetcher, a given entry specifying: a stride offset for a corresponding tracked stream of memory requests, a target address and a program counter address for a last memory access encountered for the corresponding tracked stream, and a bypass indicator indicating whether a program counter match condition is to be bypassed for the given entry; and training control circuitry to determine whether to update the stride offset for the given entry of the training data structure to specify a current stride between a target address of a current memory access and the target address for the last memory access of the corresponding tracked stream, wherein: in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and in response to the bypass indicator indicating that the program counter match condition is to be bypassed for the given entry, the training control circuitry is configured to determine whether to update the stride offset of the given entry to specify the current stride independent of whether the program counter match condition is satisfied.

Further aspects, features and advantages of the present technique will be apparent from the following description of examples, which is to be read in conjunction with the accompanying drawings.

DESCRIPTION OF EXAMPLES

Figure 1:
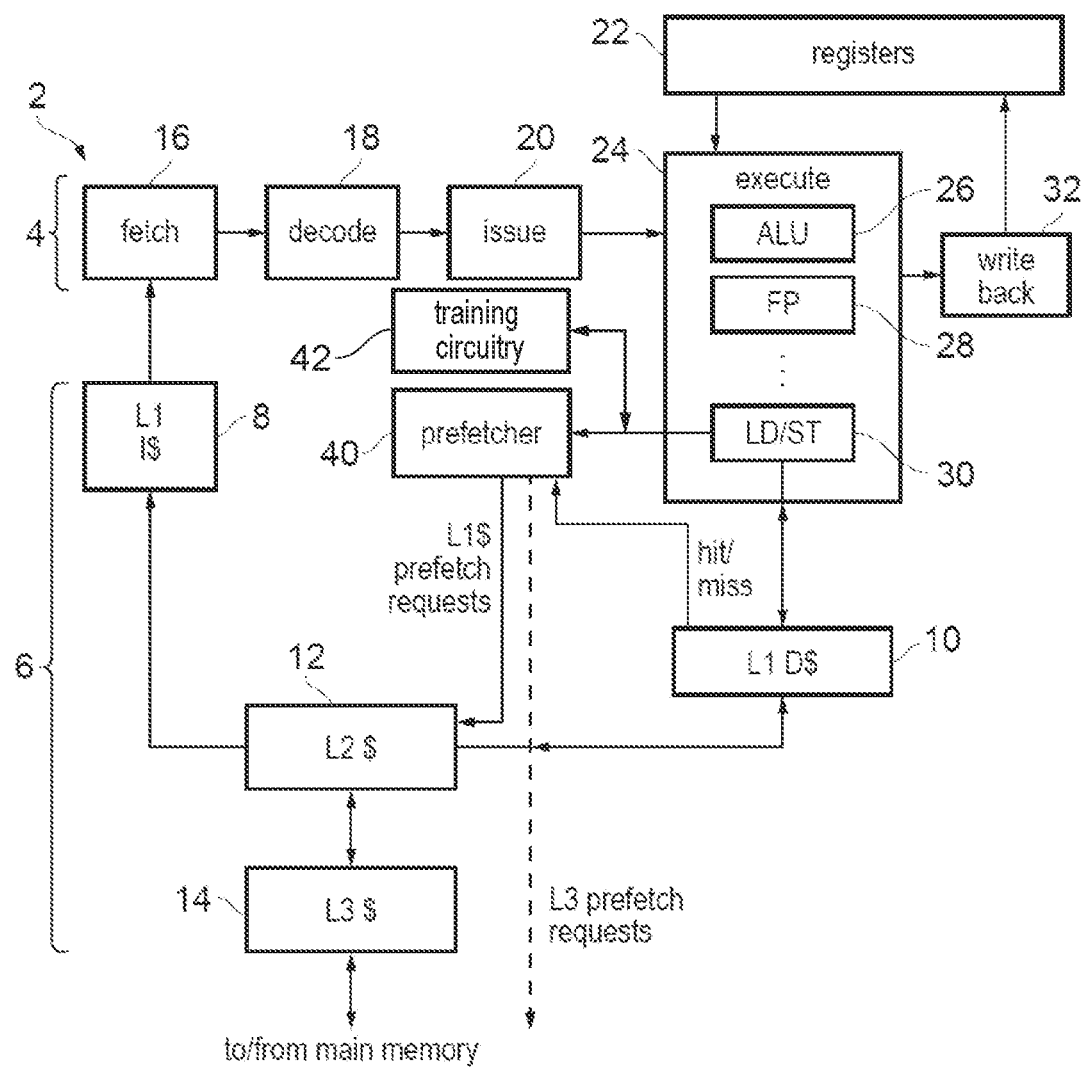
FIG. 1 schematically illustrates a data processing apparatus according to some example embodiments.

In accordance with some example embodiments, there is provided an apparatus comprising a training data structure to store a plurality of entries for training a stride prefetcher. Stride prefetchers operate by detecting a pattern of memory accesses to predict future memory accesses following the same pattern. For example, a stride sequence may involve memory accesses targeting memory addresses that are at regular intervals from each other. The memory accesses may be separated into one or more streams, each stream having a pattern that is different to another stream. In order to track the streams of memory accesses, entries are allocated to the training data structure to train the predictions made by the stride prefetcher. Each entry of the training data structure specifies a stride offset, target address and program counter address associated with the last memory access encountered in a corresponding tracked stream. The program counter address could be stored in its original form or in a more compressed form such as storing a hash value obtained as a hash function of the program counter address.

The apparatus is further provided with training control circuitry for maintaining the information stored in each entry of the training data structure. In response to a current memory access, the training control circuitry determines whether to update a given entry to reflect new information gained from the current memory access. For example, if a stride offset in the current memory access is different to an expected stride offset stored in any entry of the training data structure, the training control circuitry can determine whether the current memory access is part of a tracked stream corresponding to a given entry. If so, then the given entry can be updated to set the current stride and hence adapt the training data appropriately.

One approach for determining if the memory access is part of the tracked stream is to determine if the current memory access is associated with a program counter (PC) address that satisfies a PC match condition with the PC address of the last memory access in the tracked stream. If so, then it is likely that the memory accesses in the tracked stream are part of a loop. This approach is useful when there are multiple tracked streams being used to train the prefetcher, where individual memory accesses may be issued out-of-order or may target memory addresses that are relatively close to each other, so that without a PC match condition check there can be a risk of nearby addresses targeted by unrelated streams of accesses accidentally being tracked as a single stream, risking future mispredictions when the unrelated streams subsequently diverge.

However, while imposing a PC match condition as a condition for determining whether to update the stride offset based on the current stride can be useful in many scenarios, this approach presents a problem if, for example, such a loop is unrolled. The memory accesses in an unrolled loop will correspond to different PC addresses, and hence the PC address for each memory access in the tracked stream will not satisfy the PC match condition, even though the memory accesses with different PC addresses in the unrolled loop often do form a stream with a regular stride that would benefit from training using a single entry of the training data structure. Accordingly, if a PC match condition is imposed strictly as a requirement for updating a given training entry, the training control circuitry often may not be able to identify that the current memory access is associated with a tracked stream, which can reduce the prefetch accuracy and hence harm performance.

According to the present techniques, each entry in the training data structure further specifies a bypass indicator indicating whether a PC match condition is to be bypassed for the given entry. Therefore, when the bypass indicator indicates that the PC match condition is to be bypassed (referred to as a "bypassing entry" herein), the training control circuitry determines whether to update the stride offset of the bypassing entry independent of whether the PC address of the last memory access and the PC address of the current memory access satisfy the PC match condition. On the other hand, when the bypass indicator indicates that the PC match condition is not to be bypassed (referred to as a "non-bypassing entry" herein), the training control circuitry determines whether to update the stride offset of the non-bypassing entry depending on a determination of whether the PC address of the last memory access and the PC address of the current memory access satisfy the PC match condition.

Accordingly, the training control circuitry is capable of adaptively modifying whether the PC match condition is required to be satisfied to allow a current memory access to be identified as part of a tracked stream corresponding to a given entry. By supporting the ability to adapt whether or not the PC match condition is imposed for updates of a given entry, this allows the training data structure to track various tracked streams of memory accesses with greater accuracy even when the memory accesses are issued out-of-order and/or as part of an unrolled loop.

If the training control circuitry determines not to update any of the entries in the training data structure, then the training control circuitry may determine that the current memory access is not part of a currently tracked stream. Accordingly, the training control circuitry may further determine whether to allocate a new entry to correspond to a new tracked stream. Such an allocation may require an existing entry to be evicted, which may be decided based on an eviction policy.

The usefulness of bypassing the PC match condition may vary between different sections of code depending on the pattern of memory accesses that take place. In particular, bypassing the PC match condition may be more advantageous in some sections of code and less advantageous in others. Therefore, some examples of the apparatus is provided with mode control circuitry configured to control the training control circuitry to activate or deactivate a bypassing mode. When the bypassing mode has been activated, any new entries that are allocated to the training data structure can be allocated with or without the bypass indicator indicating that the PC match condition is to be bypassed. In other words, new entries are capable of being allocated as bypassing entries or as non-bypassing entries. However, when the bypassing mode has been deactivated, new entries can only be allocated as non-bypassing entries. Accordingly, when a data processor is executing a section of code where bypassing the PC match condition is not beneficial, the bypassing mode can be deactivated to prevent less useful bypassing entries from using up the available capacity of the training data structure.

In some examples, the mode control circuitry controls the training control circuitry to operate in the bypassing mode by default and to only deactivate the bypassing mode in response to specific conditions. Deactivation of the bypassing mode in some examples is in response to a determination that confidence in non-bypassing entries of the training data is greater than the confidence in at least one bypassing entry. Lower confidence in one or more bypassing entries than non-bypassing entries may be indicative that the bypassing entry is not accurately tracking a tracked stream of memory accesses. Therefore, the mode control circuitry may use such an indication to determine that a current section of code involves a pattern of memory accesses that is not suitable for bypassing the PC match condition and hence to deactivate the bypassing mode so that new entries are allocated as non-bypassing entries.

In other examples, the deactivation of the bypassing mode is in response to eviction of a bypassing entry from the training data structure. For an entry to be evicted, it may have had to be sufficiently low confidence compared with other entries in the training data structure. For example, other entries may have been more frequently matched against a tracked stream of memory accesses whereas the evicted entry may be less frequently or never matched against a tracked stream. If the evicted entry is a bypassing entry, then the mode control circuitry can determine that a current section of code involves a pattern of memory accesses that is less suitable for bypassing the PC match condition.

It is possible for bypassing entries to remain in the training data structure even after the bypassing mode has been deactivated. Accordingly, it is possible for the training control circuitry to update a bypassing entry as described above while the bypassing mode is deactivated. This could be an indication that at the current section of code actually is suitable for at least some bypassing of the PC match condition. Therefore, in some examples, the mode control circuitry controls the training control circuitry to reactivate the bypassing mode in response to a bypassing entry being updated.

In some examples, the mode control circuitry may delay reactivation of the bypassing mode until a bypassing entry is of relatively high confidence. Therefore if then an existing bypassing entry begins to increase in confidence, for example due to being updated one or more times by the training control circuitry in response to memory accesses, such that it reaches a confidence threshold, then the mode control circuitry may control the training control circuitry to reactivate the bypassing mode.

In other examples, the mode control circuitry reactivates the bypassing mode in response to expiration of a predetermined period. The predetermined period may begin at an event that is indicative that it is not advantageous to allocate new entries as bypassing entries. This event may be the eviction of a last bypassing entry from the training data structure, such that only non-bypassing entries remain. Accordingly, it can be determined that bypassing the PC match condition is not currently producing useful entries in the training data structure. The predetermined period therefore allows a period of time for the training control circuitry to operate without bypassing the PC match condition (i.e. the determination of whether to update a given entry in the training data structure is dependent on the PC match condition being satisfied). After the predetermined time, the apparatus can reactivate the bypassing mode to attempt to produce bypassing entries with higher confidence based on a pattern of memory accesses associated with a new section of code.

The predetermined period may be defined in a number of different ways, such as a number of new allocations to the training data structure, a number of prefetch requests issued by the stride prefetcher, or a number of executed instructions by a data processor.

When allocating a new entry to the training data structure, the training control circuitry determines whether to allocate the new entry as a bypassing entry or a non-bypassing entry. In some examples, this determination is made by reference to a maximum limit of bypassing entries that may be stored in the training data structure at once. In particular, the training data structure may determine the number of bypassing entries and compare the result to the maximum limit. If the maximum limit has not yet been reached, then the training control circuitry allocates the new entry as a bypassing entry (i.e. with a bypass indicator indicating that the PC match condition is to be bypassed for the new entry). In such examples, the training data structure can be efficiently used for both bypassing and non-bypassing entries (some capacity for non-bypassing entries is guaranteed by limiting the number of non-bypassing entries), such that the benefits of both type of entry can be achieved. This provides better performance on average because there can be opportunities to try both types of entry.

In some examples, the maximum limit is a static limit, for example set by a designer of the particular circuit implementation. In other examples, the training control circuitry may dynamically adjust the maximum limit over time. For example, the training control circuitry adjusts the maximum limit depending on configuration information indicating the aggressiveness of the stride prefetcher. In particular, when the configuration information indicates that the stride prefetcher is predicting future memory accesses more aggressively (e.g. further into the future), the training control circuitry increases the maximum limit, hence allowing for more bypassing entries to be stored in the training data structure. On the other hand, when the configuration information indicates that the stride prefetcher is predicting future memory accesses less aggressively (e.g. less far into the future), then the training control circuitry decreases the maximum limit, hence allowing fewer bypassing entries to be stored in the training data structure.

In another example, the training control circuitry adjusts the maximum limit in response to a performance metric of the stride prefetcher. The performance metric of the stride prefetcher may be any measure that is indicative of how well the prefetcher is predicting future memory accesses. This may be measured by, for example, a number of cache misses resulting from mis-predicted memory accesses, average latency of memory accesses, etc. If the prefetcher is performing relatively well with the current number of bypassing entries, then the training control circuitry may increase the maximum limit to allow more bypassing entries to be stored in the training data structure. On the other hand, if the prefetcher is performing relatively poorly with the current number of bypassing entries, then the training control circuitry may reduce the maximum limit to allow fewer bypassing entries to be stored in the training data structure.

In some examples, the training control circuitry determines whether to update the stride offset of the given entry depending on at least one other condition. The at least one other condition may need to be satisfied for an update to take place regardless of whether the PC match condition is bypassed or not. In some such examples, the at least one other condition is that the current stride of the current memory access satisfies a stride magnitude condition. In particular, since the training data structure may have a limited number of bits available to store the information associated with each entry, there may be a hardware-defined range of values available for tracking the magnitude of a stride offset. Accordingly, if the magnitude of the current stride falls outside this range, then the stride magnitude condition is not satisfied and hence the given entry is not updated to specify the current stride.

In some examples, each entry of the training data structure further specifies a confidence value that is indicative of the confidence of the tracked stream corresponding to that entry. Confidence in a given stream may depend on the extent to which subsequent accesses are detected as extending that stream, as well as optionally on other parameters such as whether accesses hit/miss in caches even in the absence of prefetching (allowing prefetching to focus on streams that would have missed in the cache), and/or timeliness information relating to whether it was possible to prefetch data into a cache soon enough that it is available in time for a subsequent access to that data. Regardless of how the confidence is updated for a particular example, in response to the confidence value exceeding a confidence threshold, the training control circuitry may update the bypass indicator to indicate that the PC match condition is not to be bypassed. In such examples, particularly those that include a maximum limit on the number of bypassing entries, updating entries with high confidence to non-bypassing entries allows an additional bypassing entry to be allocated to the training data structure (the PC match bypass no longer being required if the stream is already well established).

When the PC match condition referred to in previous examples is satisfied, it is indicative that it is probable that the PC address of one memory access is the same as the PC address of another memory access. The condition can be checked with a direct comparison of PC addresses or the PC addresses may be hashed and then compared. If either comparison results in a match, then the PC match condition is satisfied. Hence, in an example using a comparison of hashes, there can be false positives where the PC match condition may be satisfied because the hashes of the PC addresses match, even though the PC addresses themselves are not the same. To reduce risk of false positive PC matches, the hash function used can be selected to make aliasing of different PC addresses onto the same hash value more probable for PC addresses a long distance apart in the address space than PC addresses closer together in the address space.

Specific examples will now be described with reference to the drawings.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for issuing prefetch load requests for addresses determined according to an analysis of patterns of demand target addresses specified by demand memory access requests issued by the load/store unit 30. The address access patterns can be detected and then subsequently used to predict addresses of future memory accesses. In particular, the address access patterns involve stride sequences of addresses where there are a number of addresses separated at regular intervals of a constant stride value. It is also possible to detect other kinds of address access patterns (e.g.

a pattern where subsequent accesses target addresses at certain offsets from a start address).

The apparatus is provided with training circuitry 42 for maintaining prefetch state information representing the observed address access patterns, and the prefetch state information can be used by the prefetcher 40 to generate prefetch load requests which are issued to the memory system 6 to request that data is brought into a given level of cache. For example, when a trigger event for a given access pattern is detected (e.g. the trigger event could be program flow reaching a certain program counter (PC) address, or a load access to a particular trigger address being detected), the prefetcher 40 may begin issuing prefetch load requests for addresses determined according to that pattern. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled.

The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example could also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However it will be appreciated that the particular caches loaded based on the prefetch requests may vary depending on the particular circuit of implementation.

As shown in FIG. 1, as well as the demand target addresses issued by the load/store unit 30, the training of the prefetcher 40 may also be based on an indication of whether the corresponding demand memory access requests hit or miss in the level 1 data cache 10. The hits/miss indication can be used for filtering the demand target addresses from training. This recognises that it is not useful to expend prefetch resource on addresses for which the demand target addresses would anyway hit in the cache. Performance improvement can be greater in focusing prefetcher training on those addresses which, in the absence of prefetching, would have encountered cache misses for the demand access requests. Also, training can also be based on timeliness of prefetches-whether or not a prefetch generated based on a prediction of a future memory address to be accessed will cause data to be ready in the cache early enough to allow a future memory access to benefit from that prefetch.

Figure 2:
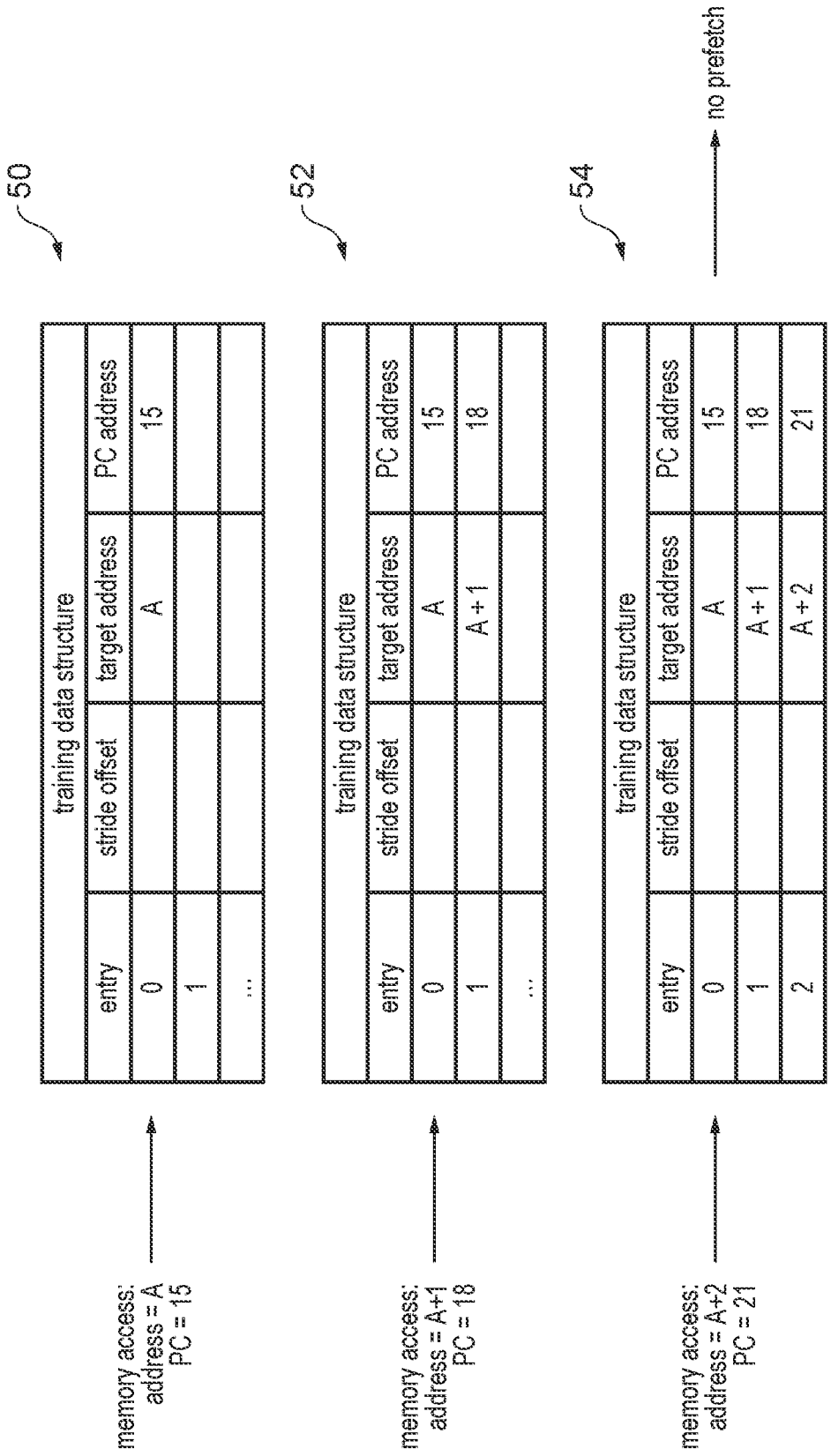
FIG. 2 illustrates an allocation of data to a training data structure.

For storing the prefetch state information as described above, the training circuitry 42 is provided with a training data structure with a plurality of entries, where each entry is used to track and analyse the pattern of memory accesses in an identified stream of memory accesses. One approach for implementing the training data structure is shown in FIG. 2. As shown, each entry specifies a stride offset that has been identified for the tracked stream of memory accesses and the target address and PC address of the latest memory access encountered in that stream. In this approach, for a memory access to be identified as part of a tracked stream, it should satisfy a PC match condition. The PC match condition may be satisfied when the PC address of the latest memory access is identical (or corresponds to a same PC hash value) as the PC address of the latest memory access in the stream. This could be determined by a comparison of the PC addresses themselves or the PC addresses could be hashed and then compared. This approach to implementing the training data structure is useful when the pattern of memory accesses includes multiple unrelated streams accessing close-together address patterns or when the pattern is performed out-of-order. By including a PC match condition as a requirement for a current access to be regarded as an extension of an existing stream, it is less likely that the stride offset of an existing entry is updated based on the stride offset of a current access relative to the latest access in that stream when the current access is actually unrelated to the latest access.

A possible problem with this approach is that if memory accesses in a stream are associated with different PC addresses, such as when a loop is unrolled, the PC match condition may never be satisfied. Loop unrolling may be performed by a compiler as an optimisation of code before it is executed on the data processing apparatus 2 and involves repeating the sequence of instructions contained in each loop iteration multiple times per iteration, to reduce the branch overhead in loop control. For example, the following example of a loop is provided with the instructions' associated PC address:

15 LDR <X> [A+n]
16 instruction 1
17 instruction 2
18 Branch

In this example, the loop begins with a load instruction to load data at a memory address A+n (with n equal to the current loop iteration) to a register X. The load is followed then followed by instruction_1 and instruction_2, which may comprise any instruction depending on the particular program. At the end of the loop, there is a branch instruction causing a branch back to the first instruction in the loop (i.e. at PC address=15). Therefore it can be seen that when executing this code, the data processing apparatus 2 will repeatedly access memory when executing the load instruction at PC address=15, with the memory addresses forming a pattern that increases by 1 on each access. In other words, this loop contains a stream of memory access with a stride of 1. It will be appreciated that this is only a simple example for the purposes of explanation and the pattern of memory accesses may be more complex, such as by including several memory accesses per loop iteration. The branch instruction may also specify a condition to define whether the branch is to be taken or not taken.

As part of an optimisation by a compiler, this code may be unrolled and reformulated as:

15 LDR <X> [A]
16 instruction 1
17 instruction_2
18 LDR <X> [A+1]
19 instruction 1
20 instruction_2
21 LDR <X> [A+2]
22 instruction 1
23 instruction 2
N Branch While this may seem less efficient in terms of storage density of the program code, it can improve performance at runtime because a higher fraction of the executed instructions carry out the useful data transfer and arithmetic operations, and fewer branches are necessary. Each branch instruction may carry a risk of branch misprediction requiring a costly pipeline flush, so executing fewer branches for a given section of code can be beneficial for performance.

However, due to the unrolling, each iteration of the load instruction is now associated with a different PC address (i.e. the PC address is 15, then 18, then 21). This may cause problems in the implementation of the training data structure shown in FIG. 2.

In a first state 50, the training data structure has identified a new tracked stream based on a first memory access targeting a memory address A and associated with a PC address 15. To begin tracking the stream, entry 0 is allocated specifying the target address A and the PC address 15. Note that, since only one memory access has been identified, there is no known stride offset, and hence the prefetcher 40 would not be able to begin issuing prefetch requests based on the training data until a pattern of the memory accesses can be analysed.

In a second state 52, the training data structure receives information regarding a second memory access in the stream directed towards the memory address A+1. It could be seen that since there is a difference of +1 between the target address of the first access and the second access, there is a stride offset of +1 in this tracked stream of memory accesses. However, when the memory accesses occur in an unrolled loop as shown above, the PC address of the second memory access will not be the same as the PC address of the first memory access. In particular, the second memory access has a PC address of 18 meaning that the PC match condition will not be satisfied and the second memory access may be identified as a separate stream of memory accesses. Accordingly, entry 1 may be allocated specifying the target address A+1 and the PC address 18. Furthermore, since the memory accesses have been identified as part of different tracked streams, the training data structure cannot calculate a stride offset for either of them and the prefetcher 40 still would not be able to begin issuing prefetch requests.

In a third state 54, the training data structure receives information about a third memory access directed towards the memory address A+2. Again, it can be seen that the stride offset should still be +1. However, since the memory access is associated with a PC address of 21, the PC match condition is not satisfied and a new entry 2 may be allocated to the training data structure. In this example where the training data structure has capacity for only three entries, the training data structure has now been filled with entries that cannot specify a stride offset. Accordingly, the prefetcher 40 cannot use any of the information stored in the training data structure to initiate any prefetch requests and the performance of the prefetcher 40 is reduced.

Figure 3:
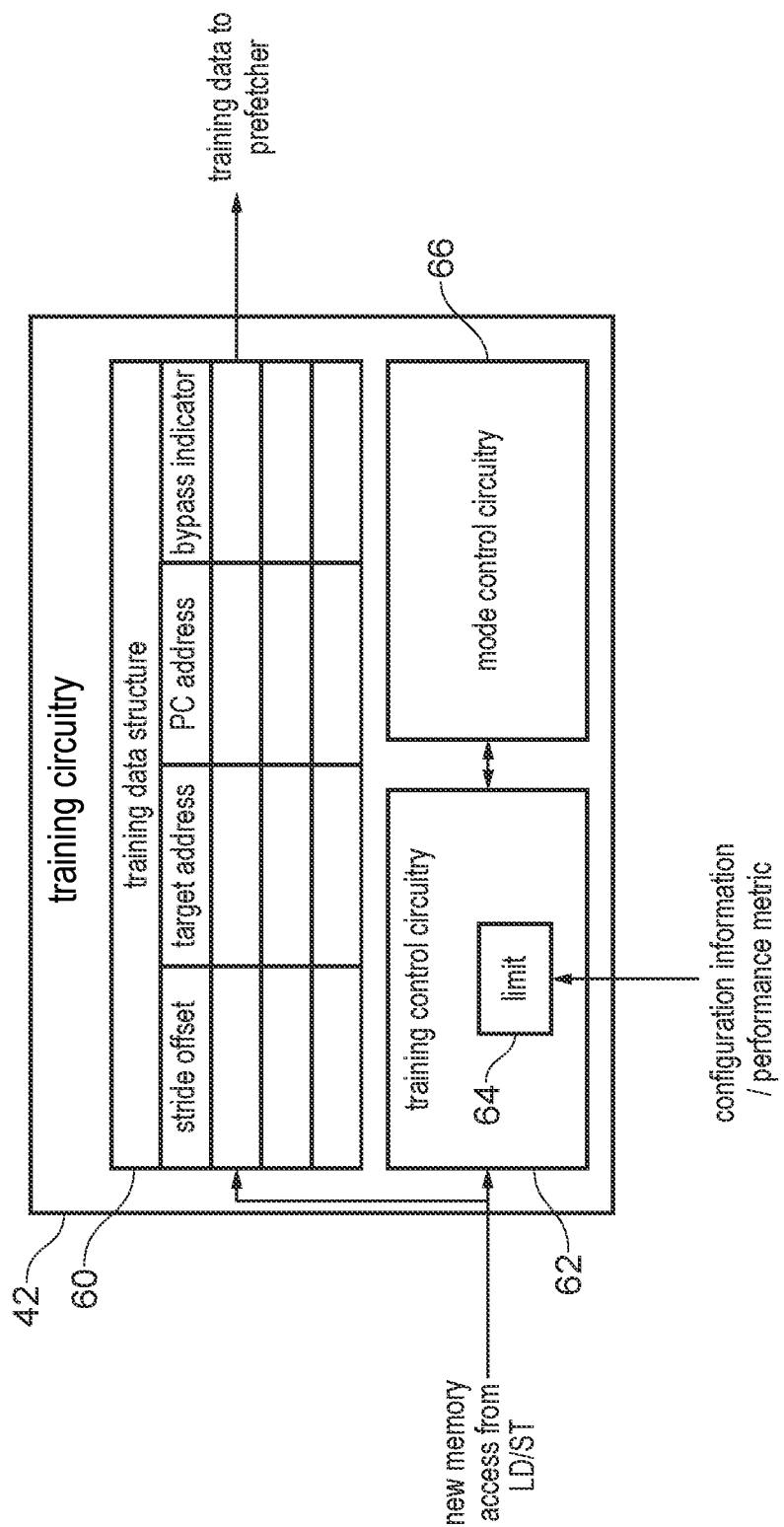
FIG. 3 schematically illustrates training circuitry according to some example embodiments.

FIG. 3 illustrates an example of the training circuitry 42 (corresponding to the claimed apparatus) according to the present techniques. The training circuitry 42 is provided with the training data structure 60, which additionally provides each entry with a bypass indicator field for indicating whether a PC match condition is to be bypassed for that entry. The bypass indicator may, for example, be implemented as a binary flag where '1' is interpreted to indicate that the PC match condition is to be bypassed and '0' is interpreted to indicate that the PC match condition is not to be bypassed. Other ways of encoding the bypass indicator are also possible.

When a new memory access is detected, the training control circuitry 62 determines whether to update the stride offset for a given entry of the training data structure 60. This determination is based on an identification of whether the detected memory access is part of the tracked stream that corresponds to the given entry. Based on the value of the bypass indicator, the training control circuitry determines whether updating of the stride offset for the given entry should be dependent on, or independent of, whether the PC match condition is satisfied. The training control circuitry may perform this determination for a plurality of entries in the training data structure in parallel. Hence, by allowing some entries (bypassing entries which have the bypass indicator set to indicate a PC match bypass) to ignore the PC match condition when deciding whether to extend an existing stream based on a current memory access, this better supports loop unrolling scenarios, but other entries (non-bypassing entries which have the bypass indicator set to indicate that no PC match bypass is required) still impose the PC match condition as a condition for updating the stride offset of the entry, so that those entries can better support non-loop-unrolling scenarios where the PC match condition is beneficial to avoid spurious stride updates based on a current access unrelated to a last access. The training circuitry 42 shown in FIG. 3 therefore provides better average prefetcher performance as it is less likely that the majority of training entries end up allocated to useless streams unable to be extended in a loop unrolling scenario as shown in the example of FIG. 2.

Figure 4:
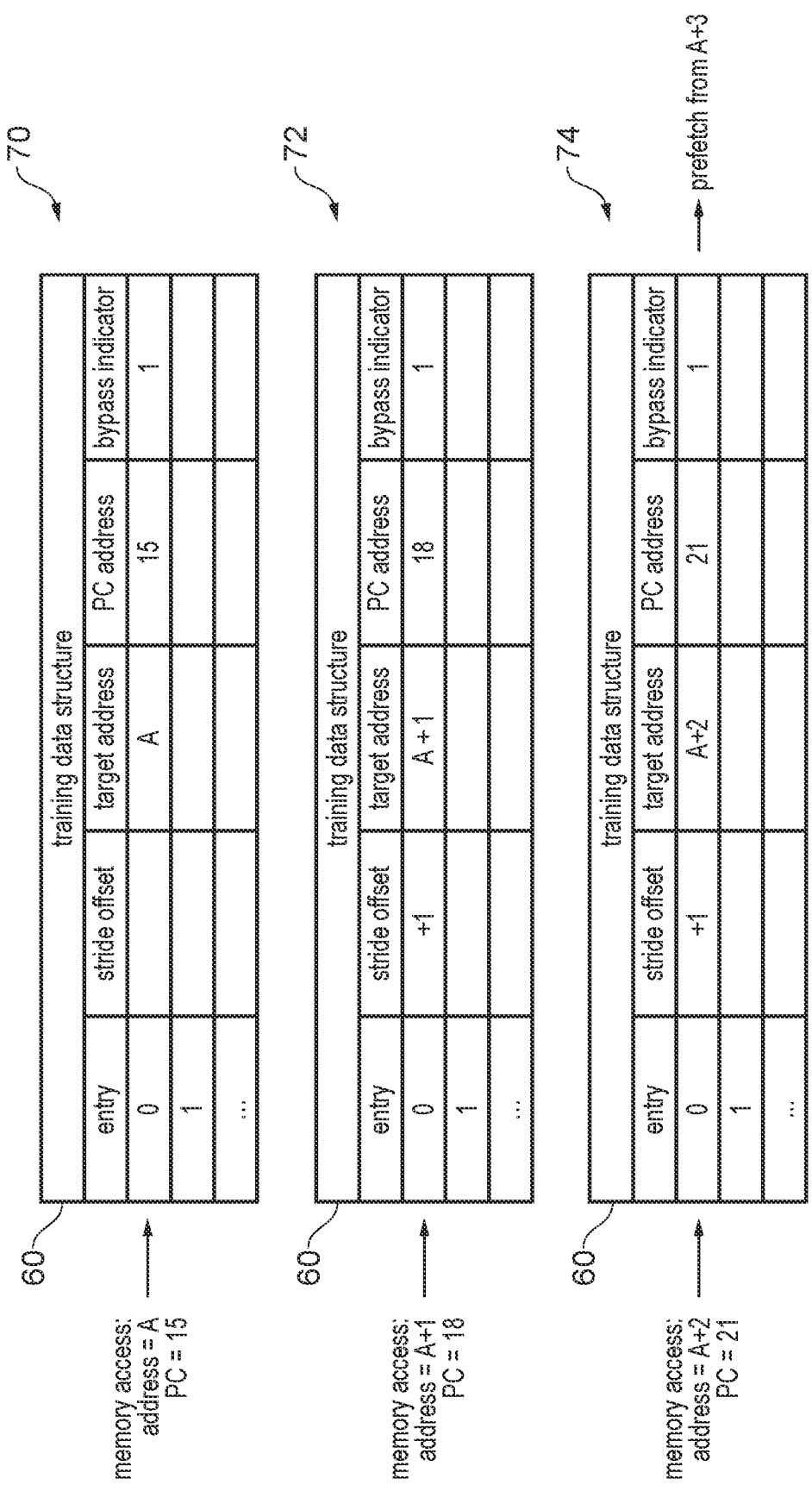
FIG. 4 illustrates the allocation of data for a training data structure according to some example embodiments.

FIG. 4 illustrates an example of how entries are allocated to the training data structure 60 according to the present techniques for a similar pattern of memory accesses as the example implementation in FIG. 2. In the first state 70, a first memory access targeting a memory address A and associated with a PC address 15 is detected. To begin tracking the stream, entry 0 is allocated specifying the target address A and the PC address 15. Additionally, the training control circuitry 62 sets the bypass indicator of entry 0 to 1 to indicate that the PC match condition is to be bypassed for entry 0.

In a second state 72, a second memory access targeting a memory address A+1 and a PC address 18 is detected. The training control circuitry 62 then performs a determination of whether to update an entry of the training data structure 60 to specify a current stride between the target address of the current memory access (i.e. the second memory access) and the target address of the last memory access (i.e. the first memory access). The training control circuitry 62 is responsive to the bypass indicator of entry 0 indicating that the PC match condition is to be bypassed, and accordingly performs the determination of whether to update entry 0 independent of whether the PC match condition is satisfied. In this example, the PC match condition is not satisfied (similar to in FIG. 2), however entry 0 is still updated because the memory access is otherwise identified as being part of the same tracked stream. Accordingly, entry 0 is updated to specify the current stride offset between the target address A and the target address A+1 (i.e. the stride offset is specified as +1 in entry 0).

In a third state 74, a third memory access targeting address 21 is detected. The third memory access continues the stride pattern in the first and second memory accesses. Since entry 0 still specifies a bypass indicator indicating that the PC match condition is to be bypassed, the training control circuitry 62 may identify that the third memory access is part of the same tracked stream despite the PC match condition not being satisfied. Accordingly, entry 0 is updated to specify the current stride offset and to update the last target address.

Since a stride offset has been specified in states 72 and 74, the information held in the training data structure 60 is sufficient for the prefetcher 40 to begin issuing prefetch requests. In particular, the prefetcher 40 may predict that the next memory access in the tracked stream will continue the pattern to target the address A+3 and so issues a prefetch request to that address. Accordingly, the stride offset can be more accurately tracked for training the prefetcher 40 even when the PC addresses do not satisfy the PC match condition. Also, as well as enabling prefetching to being for the stream involved in the loop unrolling, another benefit is that entries 1 and 2 (which were occupied in the example of FIG. 2 for useless streams which cannot be extended) are freed up for use in training other streams for prefetch prediction. Hence, the available entries in the training structure can be better utilised. Hence, as well as improving prefetch accuracy, this approach can also allow the total number of entries in the training data structure 60 required for providing a given level of prefetch performance to be reduced, saving circuit area.

Figure 5:
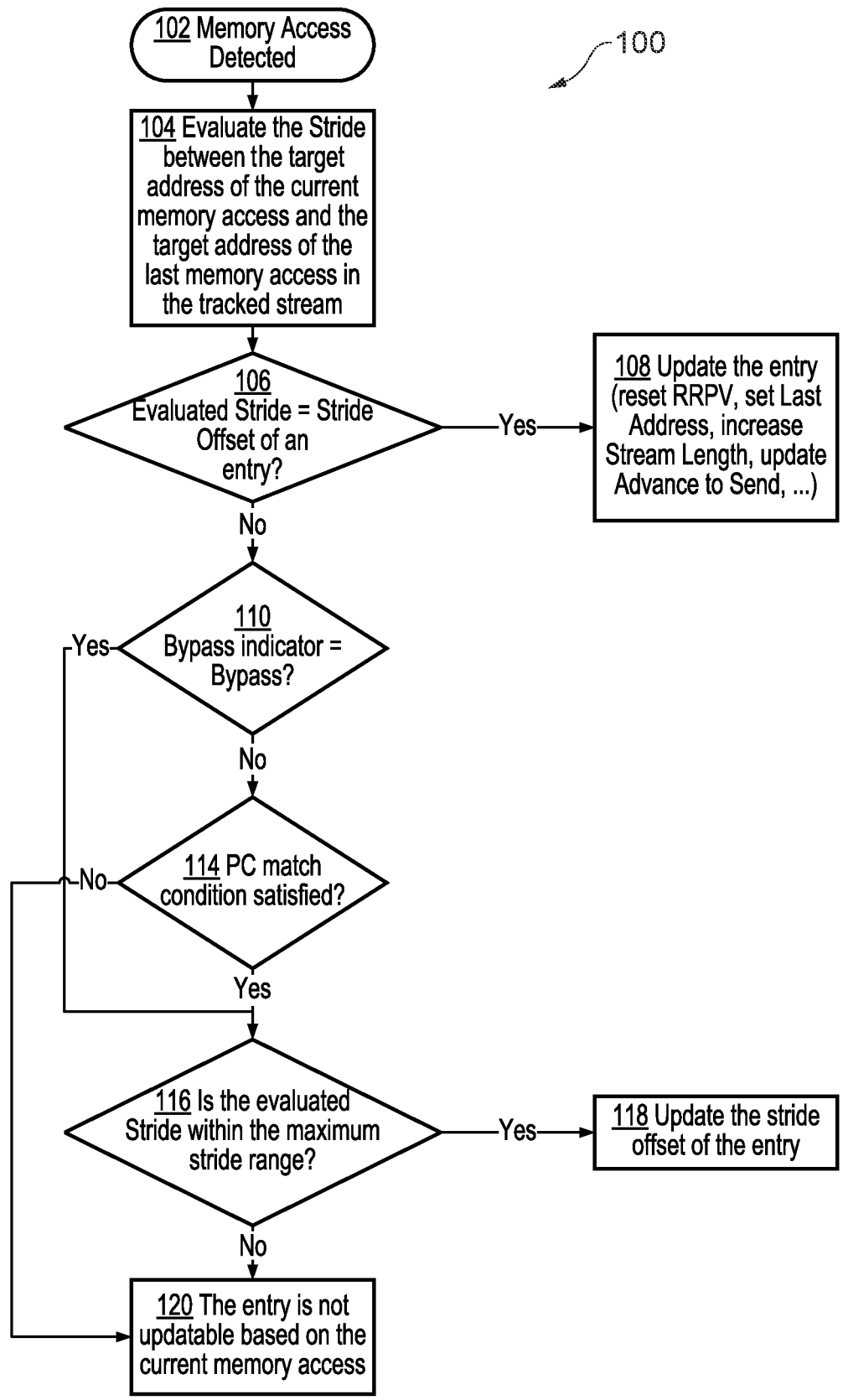
FIG. 5 shows a series of steps for determining whether to update a given entry of the training data structure.

FIG. 5 shows a method 100 comprising a series of steps corresponding to the determination process performed by the training control circuitry 62. Note that, in some examples, the training control circuitry 62 performs this process in parallel for each entry of the training data structure 60. Accordingly, while FIG. 5 and the following description may refer to an "entry" in the singular, it will be appreciated that each step may be performed for a plurality of entries in parallel. The process begins at step 102 when a memory access is detected, for example in response to a load or store operation performed by the load/store unit 30. In step 104 the stride is evaluated by calculating the difference between the memory addresses of the current memory access (i.e. the memory access detected in step 102) and the last memory access encountered in the tracked stream based on the information stored in an entry of the training data structure 60. At step 106, the training control circuitry 62 checks if a stride match condition is satisfied by checking if the entry indicates that the evaluated stride is what was to be expected according to the pattern in the tracked stream. If the stride match condition is satisfied (i.e. Yes at 106), then the current memory access is identified as being part of the tracked stream of memory accesses corresponding to that entry. Accordingly, at step 108, the entry is updated to set the last address of that entry to correspond to the target address of the current memory access and to update any further values that may be stored in the entry such as a stream length, an eviction counter (RRPV—reset to a value indicating a less preferred entry for eviction), etc.

If the stride match condition is not satisfied (i.e. No at 106), then the training control circuitry 62 checks if the bypass indicator for the entry indicates that the PC match condition is to be bypassed or not. If not (i.e. No at 110), then the training control circuitry compares the PC addresses (or a hash of the PC addresses) for the current memory access and the last memory access encountered in the tracked stream at step 114 to evaluate whether the PC match condition is satisfied. If the PC match condition is not satisfied (i.e. No at 114), then the current memory access is not identified as being part of the tracked stream corresponding to the entry.

If the PC match condition is satisfied (i.e. Yes at 114), then the training control circuitry 62 may update the stride offset of the entry in dependence on any other condition imposed by the particular implementation. In this example, at step 116, the training control circuitry 62 checks if the evaluated stride satisfies a stride magnitude condition. The stride magnitude condition imposes a maximum stride range that may be hardware-defined by the number of bits available to store a stride offset value in an entry of the training data structure 60. The stride magnitude condition further acts as an upper limit to the stride offset such that a stream of memory accesses that do not actually form a pattern does not cause excessively large stride values to be stored in the training data storage 60. If the evaluated stride falls within maximum stride range, then the entry is updated to specify the evaluated stride as the stride offset (step 118).

Returning to step 110, if the bypass indicator indicates that the PC match condition is to be bypassed, then step 114 is bypassed and the process proceeds straight to step 116. Accordingly, an entry containing such a bypass indicator can be updated using the current stride even if the PC match condition is not satisfied.

If the PC match condition is not bypassed and not satisfied (i.e. No at 114) or the stride magnitude condition is not satisfied (i.e. No at 116), then the training control circuitry 62 determines that the entry is not updatable based on the current access at step 120. As above, since this process may be performed for each entry of the training data structure 60 in parallel, some entries may be determined to be updated whereas other entries may be determined to be not updatable by the training control circuitry 62.

It will also be appreciated that it is possible for every entry in the training data structure 60 to be determined as not updatable based on the current access, in which case the training control circuitry 62 may determine whether to allocate a new entry to the training data structure 60. Referring back to FIG. 3, when allocating a new entry, the training control circuitry 62 may be configured to refer to a limit value 64 to control the maximum number of entries specifying a bypass indicator indicating that the PC match condition should be bypassed (referred to as "bypassing entries" herein). It would be appreciated that, while there are scenarios where bypassing the PC match condition is beneficial, such as for unrolled loops, the advantages of implementing the PC match condition is still present for many use-cases such as when a stream of memory accesses is issued out-of-order. Accordingly, the present techniques provide control over whether entries are allocated to the training data structure 60 as bypassing entries or non-bypassing entries based on the limit 64 of bypassing entries.

In some examples, the limit 64 is implemented as a static value (e.g. fixed in hardware at a certain value, such as 1, 2 or more). In other examples, the limit 64 is programmable or adjustable over time. In particular, the limit 64 may be adjusted depending on a configuration of the prefetcher 40. For example, configuration information indicating the aggressiveness of the prefetcher 40 may be referred to when adjusting the limit 64. Depending on the aggressiveness, the prefetcher 40 predicts memory accesses more aggressively (further into the future) or less aggressively (less far into the future). The granularity of the configuration information will depend on the particular implementation and may include a "low", "medium" and "high" aggressiveness, or a percentage of a maximum aggressiveness. The configuration information is then used to generate a suitable value for the limit 64, such as a by generating a higher value for higher aggressiveness and a lower value for lower aggressiveness.

For another example, the limit 64 may be adjusted depending on a performance metric indicative of how well the prefetcher 40 is performing. The performance of the prefetcher 40 may be measured in many different ways, such as a frequency of cache misses on predicted memory accesses or an average latency of memory accesses in a particular tracked stream. When the prefetcher 40 is performing well with the current limit 64, then the training control circuitry 62 may increase the limit 64 to allow more bypassing entries in the training data structure 60. Conversely, if the prefetcher 40 is performing relatively poorly with the current limit 64, then the training control circuitry 62 may reduce the maximum limit to allow fewer bypassing entries in the training data structure 60.

Figure 6:
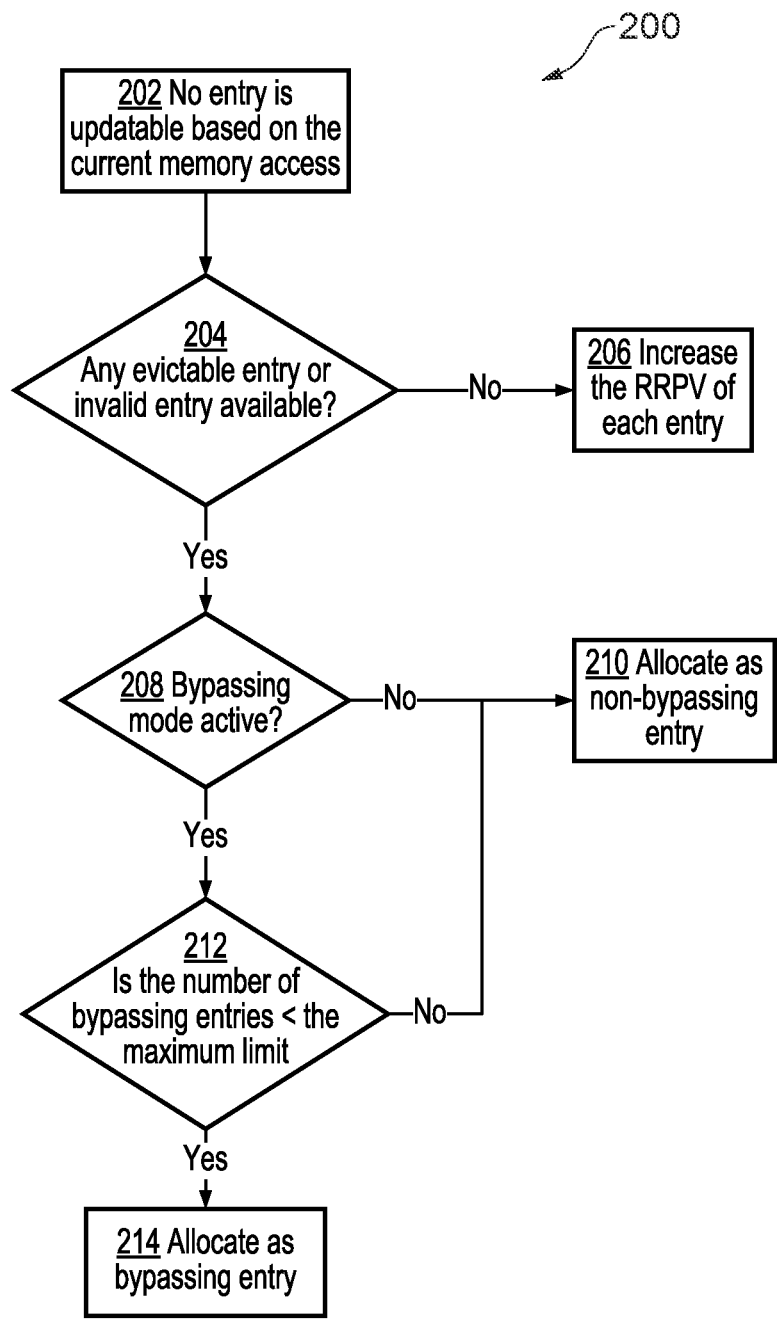
FIG. 6 shows a series of steps for determining whether to allocate a new entry as a bypassing entry or a non-bypassing entry.

FIG. 6 shows a method 200 comprising a series of steps corresponding to the allocation process performed by the training control circuitry 62. The method begins at step 202 with the determination that no entry is updatable based on the current memory access. Step 202 may be considered equivalent to reaching step 120 of method 100 for every entry in the training data structure 60, in which case method 200 may be considered a continuation of the method 100.

At step 204, the training control circuitry 62 determines whether there are any evictable entries or invalid entries present in the training data structure. An evictable entry may be an entry that satisfies a condition of a replacement policy. The particular replacement policy may vary depending on the particular implementation and may include least-recently-used, first-in-first-out, and so on. In this example, a re-reference prediction value (RRPV) is provided for each entry to indicate the likelihood that the entry is to be reused. As time progresses without using an entry, the likelihood of that entry being reused decreases, and the RRPV is adjusted accordingly. If the RRPV reaches a threshold, then the entry is considered sufficiently unlikely to be reused and is marked as an evictable entry. Accordingly, if an evictable entry is present then at step 204, the training control circuitry 62 causes that entry to be evicted so that a new entry can be allocated to begin tracking a new stream corresponding to the memory access detected in step 102. If no evictable entry is present, then at step 206, the RRPV of each entry is increased (in this example, a higher RRPV indicates a lower likelihood of reuse). The resetting of the RRPV value when an entry is able to be updated with an evaluated stride at step 108 of FIG. 5 means that the RRPV values will tend to track which entries are more used than others. It will be appreciated that this is just one example of an eviction policy, and other examples could also be used.

If there is an evictable or invalid entry available (i.e. Yes at 204), then at step 208, the flow splits depending on whether the training control circuitry 62 is operating in a bypassing mode, in which a new entry is capable of being allocated as a bypassing entry. When the bypassing mode is inactive (i.e. No at 208), the training control circuitry 62 cannot allocate new entries as bypassing entries. Accordingly, at step 210, the new entry is allocated as a non-bypassing entry.

It will be appreciated that some examples of the training control circuitry 62 may operate in the bypassing mode at all times without the capability of deactivating the bypassing mode. In such examples, step 208 is not necessary and the process may flow from step 204 directly to step 212.

In step 212, if the bypassing mode is active, the training control circuitry 62 compares the number of bypassing entries currently stored in the training data structure 60 to the limit 64. If the number of bypassing entries is less than the limit 64 (i.e. Yes at 212), then the training control circuitry 62 allocates the new entry as a bypassing entry in step 214. However, if the number of bypassing entries has reached the limit 64 (i.e. No at 212), then the training control circuitry 62 allocates the new entry as a non-bypassing entry in step 210.

According to the above description, the training control circuitry 62 is capable of controlling the entries in the training data structure 60 to bypass the PC match condition to a degree that is appropriate for the streams of memory accesses being tracked in the training data structure 60.

However, it is recognised that bypassing the PC match condition for one or more tracked streams may be more appropriate in some sections of code executed by the data processing apparatus 2, but less appropriate in other sections of code. Accordingly, the training circuitry 42 is provided with mode control circuitry 66 to control whether the training control circuitry 62 operates in the bypassing mode briefly mentioned above. The bypassing mode is a mode of operation in which the training control circuitry 64 is capable of allocating bypassing entries in the training data structure 62. When the bypassing mode is deactivated by the mode control circuitry 66, the training control circuitry cannot allocate new entries as bypassing entries and instead allocates new entries as non-bypassing entries.

The mode control circuitry 66 is responsive to any indication that bypassing entries are of lower confidence than non-bypassing entries. In some examples, the confidence of each entry is measured to determine if the confidence in non-bypassing entries is greater than confidence in any of the bypassing entries. Such a determination could indicate that bypassing the PC match condition is not providing beneficial training data for the prefetcher 40. In other examples, the mode control circuitry 66 is responsive to a bypassing entry being evicted from the training data structure 60 according to an eviction policy as described previously. An eviction of a bypassing entry would indicate that the non-bypassing entries are being used (i.e. detected memory accesses are identified as being part of the tracked stream corresponding to those entries) more frequently, and therefore bypassing the PC match condition is not as beneficial. Accordingly, the mode control circuitry 66 may use such indications to cause the training control circuitry to deactivate the bypassing mode to prevent additional bypassing entries from being allocated to the training data structure 60.

The mode control circuitry 66 may also be responsive to indications that bypassing entries are beneficial. This could occur, for example, when a detected memory access is identified as being part of the tracked stream corresponding to that bypassing entry. If this occurs while the bypassing mode is deactivated, then the mode control circuitry 66 causes the training control circuitry 62 to reactivate the bypassing mode.

If the confidence in bypassing entries is sufficiently low relative to non-bypassing entries, such as when all bypassing entries have been evicted from the training data structure 60, it is recognised that it is likely for new bypassing entries to be evicted without being useful. This could cause unnecessary thrashing in the training data structure 60 due to entries being frequently allocated and evicted. Therefore in some examples, the mode control circuitry 66 controls the training control circuitry 62 to enter a "sleep" mode, where the bypassing mode is kept inactive for a predetermined period. The predetermined period may be defined using an amount of time, a number of new allocations to the training data structure 60, or a number of instructions executed by the data processing apparatus 2. Once the predetermined period expires, the bypassing mode can be reactivated to ascertain whether the current section of code causes a pattern of memory accesses that could benefit from bypassing the PC match condition.

Figure 7A:
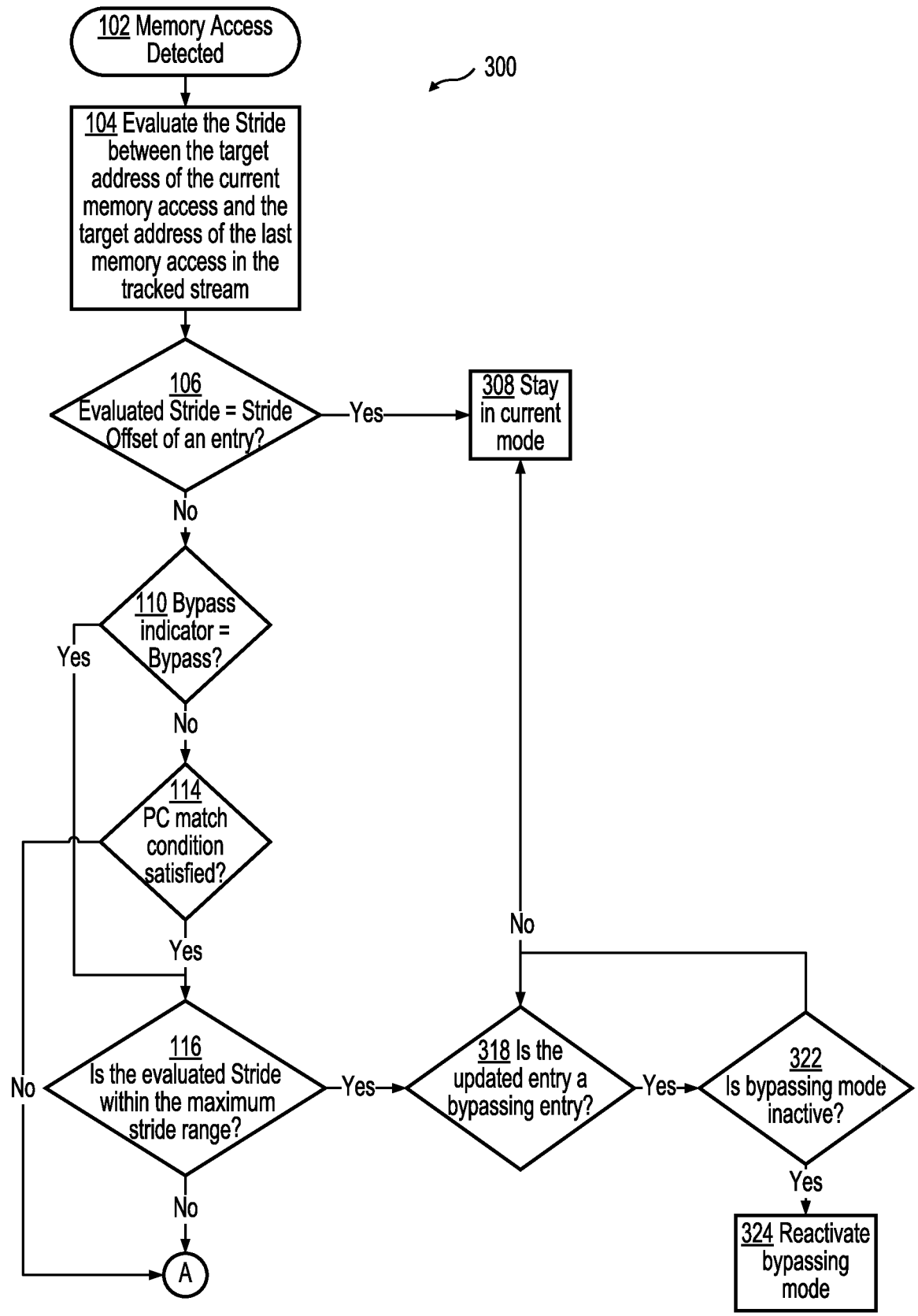
FIGS. 7A and 7B show a series of steps for controlling a bypassing mode.
Figure 7B:
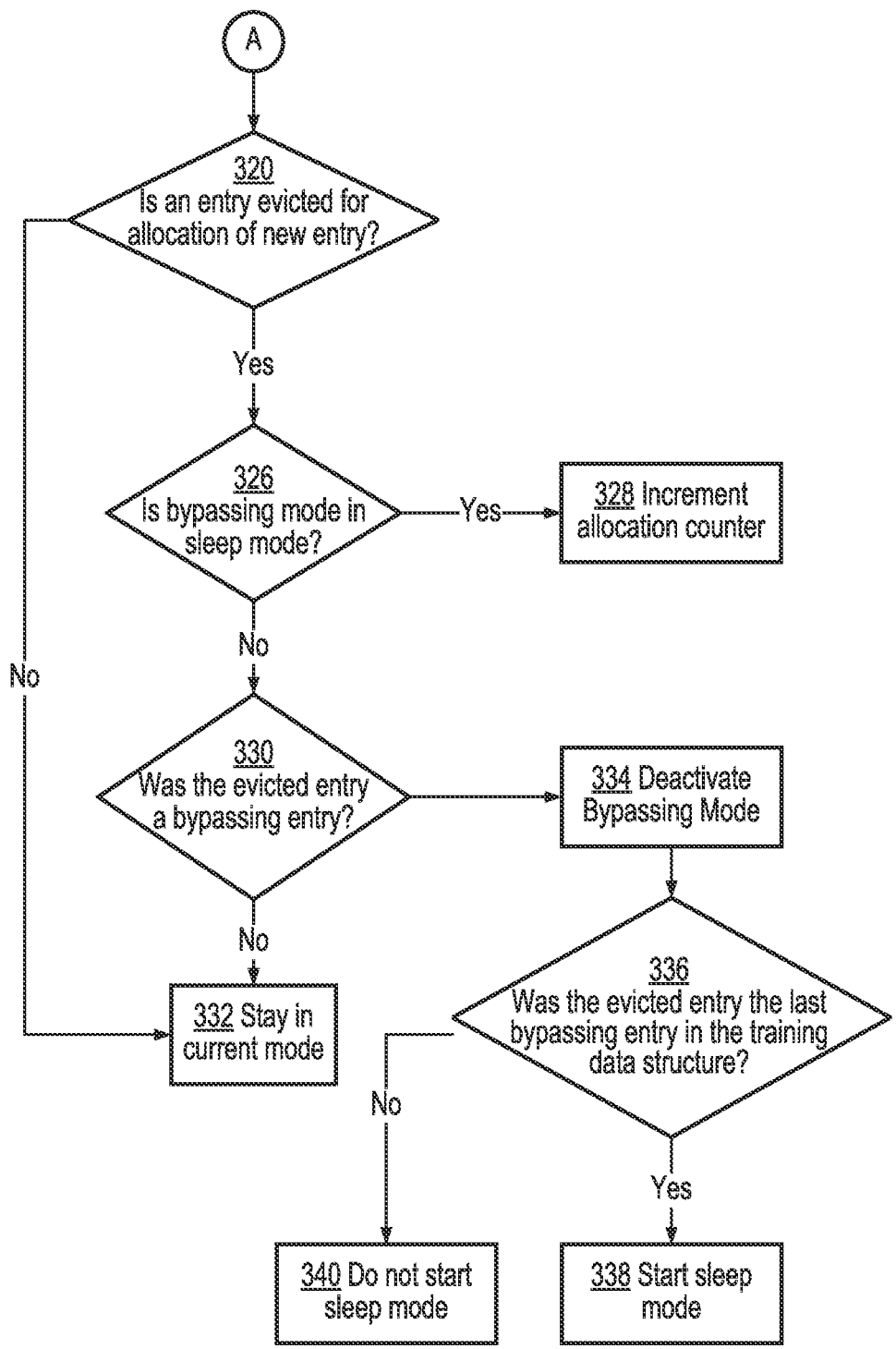

FIGS. 7A and 7B illustrate a method 300 for how the mode control circuitry 66 controls when to activate or deactivate the bypassing mode. Some of the steps of method 300 may take place substantially simultaneously as the corresponding method steps in method 100 of FIG. 5, and so those steps will be referred to with the same reference numerals. Moreover, as with the method 100, at least steps 104 to 116 of the method 300 may also be performed in parallel for each entry in the training data structure 60. As previously described, the training control circuitry 62 determines if a stride match condition is satisfied by an entry in step 106. If so (i.e. Yes at 106), then the mode control circuitry 66 causes the training control circuitry 62 to stay in the current mode at step 308 (i.e. the bypassing mode is not activated or deactivated).

If the stride match condition is not satisfied (i.e. No at 106), then the training control circuitry 62 performs the same process for determining whether to update the entry as described in relation to FIG. 5 between steps 110 to 116. If the training control circuitry 62 determines to update an entry in the training data structure 60, for example because the PC match condition was satisfied or bypassed and the stride magnitude condition was satisfied (i.e. Yes at 116), then it is determined whether the updated entry is a bypassing entry or a non-bypassing entry at step 318. If the updated entry is a bypassing entry (i.e. Yes at 318), then the mode control circuitry 66 detects an indication of increased confidence in a bypassing entry. Accordingly, if the bypassing mode is currently deactivated (i.e. Yes at 322), the mode control circuitry 66 causes the training control circuitry 62 to reactivate the bypassing mode at step 324 and otherwise (i.e. No at 322) remains in the current mode.

If the updated entry was not a bypassing mode (i.e. No at 318), then the mode control circuitry 66 does not detect an increased confidence in a bypassing entry. Accordingly, the mode control circuitry 66 maintains the current mode of the training control circuitry 62 at step 308.

However, if the training control circuitry 62 determines not to update an entry of the training data structure, for example because the PC match condition was not satisfied (i.e. No at 114) or the stride magnitude condition was not satisfied (i.e. No at 116), then the process continues to step 320 in FIG. 7B (i.e. while the training control circuitry 62 allocates a new entry). The mode control circuitry 66 determines whether an allocation has caused an entry to be evicted from the training data structure 60. If not, (i.e. No at 320), then the mode control circuitry 66 maintains the current mode of the training control circuitry 62 at step 332. If so, (i.e. Yes at 320), then, in step 326 the mode control circuitry 66 determines whether the bypassing mode is currently in the sleep mode described above. If so (i.e. Yes at 326), then an allocation counter is incremented at step 328. As described above, a counter to track the number of allocations to the training data structure 60 is one example of the predetermined period. It will be appreciated that other examples of the predetermined period, including those other examples mentioned previously, could be implemented at step 328 instead of the allocation counter. If the bypassing mode is not in the sleep mode (i.e. No at 326), then it is determined whether the evicted entry was a bypassing entry at step 330. If the evicted entry was not a bypassing entry (i.e. No at 330), then the mode control circuitry 66 does not ascertain any information about whether bypassing the PC match condition is currently useful or not. Accordingly, the training control circuitry 62 stays in whatever mode it is currently in at step 332.

If the evicted entry was a bypassing entry (i.e. Yes at 330), then the mode control circuitry 66 detects the indication that bypassing the PC match condition has not been useful. Accordingly, at step 334, the mode control circuitry 66 causes the bypassing mode to be deactivated. Furthermore, it is determined whether the evicted entry was the last bypassing entry in the training data structure 60. If all bypassing entries have been evicted, then the mode control circuitry 66 determines that bypassing the PC match condition is not useful in the current section of code being processed by the data processing apparatus 2. Accordingly, at step 338, the sleep mode is started to keep the bypassing mode deactivated for the predetermined period. In this example, activating the sleep mode includes resetting the allocation counter to begin tracking allocations to the training data structure 60 during the sleep mode. On the other hand, if other bypassing entries still remain in the training data structure 60, then there is still an opportunity for a detected memory access to be matched against the tracked stream corresponding to a bypassing entry. Accordingly, in step 340, mode control circuitry 66 does not start the sleep mode.

Figure 8:
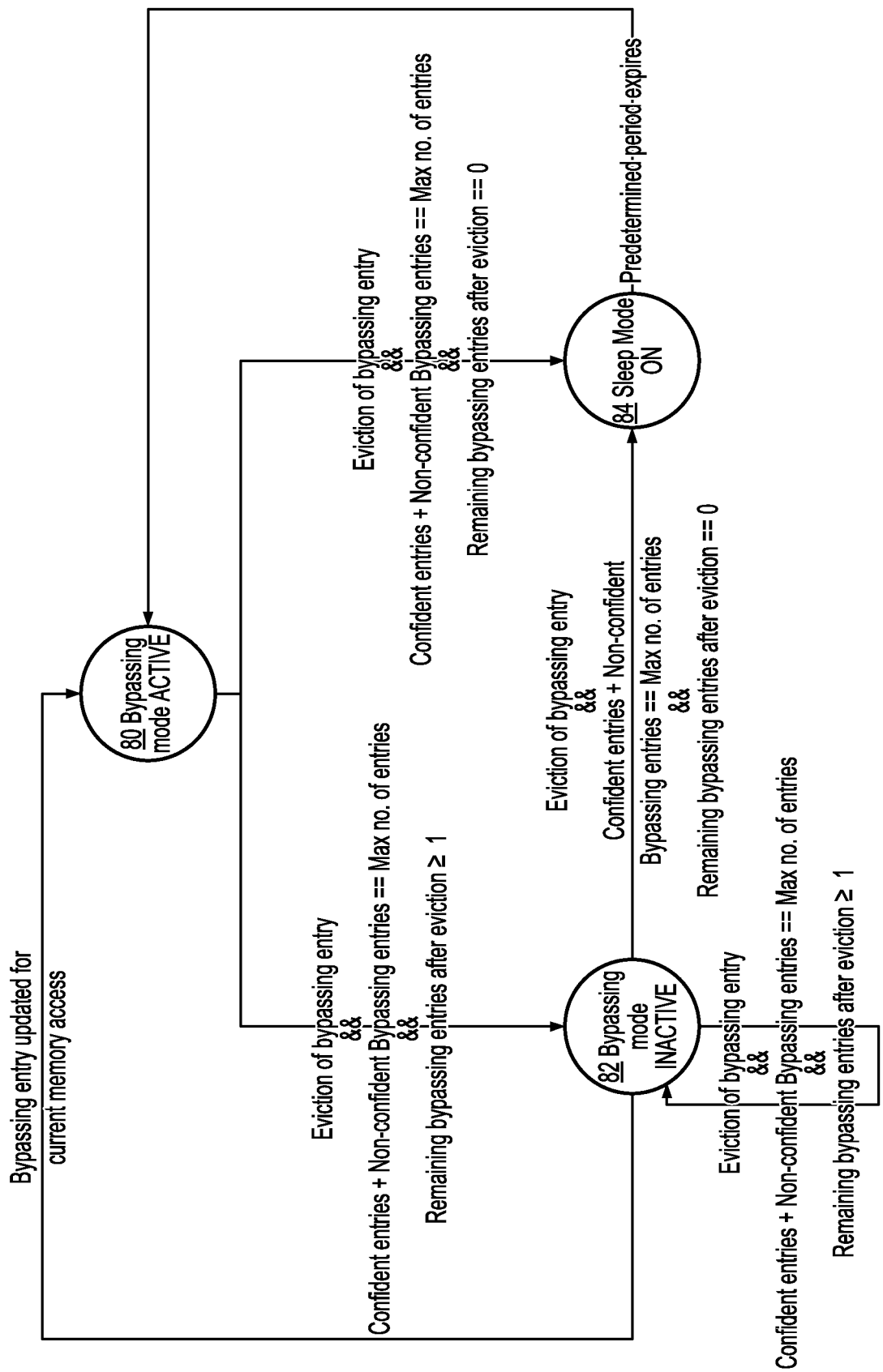
FIG. 8 shows a transition between bypassing mode states.

FIG. 8 illustrates a directed graph showing one example of transitions between activating/deactivating the bypassing mode and the sleep mode. Assuming the training control circuitry 62 operates in the bypass mode active state 80 by default, the mode control circuitry 66 is responsive to an eviction of a bypassing entry to determine whether to control the training control circuitry 62 to transition to the bypassing mode inactive state 82. In particular, the mode control circuitry 66 checks the number of bypassing entries that are present after the eviction to determine whether the evicted entry was the last bypassing entry, as described above. Furthermore, in this example the mode control circuitry 66 also checks whether the total of the number of confident entries (i.e. entries from which the prefetcher 40 predicts future memory accesses—non-confident entries being ignored by the prefetcher until they reach sufficient confidence) and the number of bypassing entries is equal to the maximum number of entries of the training data structure 60. This provides an indication of whether the non-confident entries consist of only bypassing entries, which in turn indicates whether bypassing the PC match condition is producing useful training data. Also, this avoids unnecessarily deactivating the bypass mode if there is still sufficient capacity in the training structure to allocate another non-bypassing entry even if bypassing mode was still active.

Based on these checks, if the evicted bypassing entry is not the last bypassing entry and the total of the number of confident entries and non-confident bypassing entries does equal the maximum number of entries, the mode control circuitry 66 controls the training control circuitry 62 to transition to the bypassing mode inactive state 82.

The bypassing mode stays in the inactive state 82 as more bypassing entries are evicted until the number of remaining bypassing entries after eviction is zero. Then, the mode control circuitry 66 activates the sleep mode state 84. Similarly, if the evicted bypassing entry above is the last bypassing entry in the training data structure 60, then the mode control circuitry 66 controls the training control circuitry 62 to transition directly to the sleep mode state 84. The sleep mode state 84 is maintained until the predetermined period expires as described in previous examples, at which point the bypassing mode is set to the active state 80 again.

While the bypassing mode is in the inactive state 82, the mode control circuitry is responsive to a bypassing entry being updated for a current memory access (e.g. as at step 108 or 118 of FIG. 5) to set the bypassing mode back to the active state 80. The update is indicative of a detected memory access in the tracked stream corresponding to that bypassing entry. Accordingly, bypassing the PC match condition is indicated to still be of some benefit.

Based on the above description, the training circuitry 42 is capable of adapting to different sections of code being executed by the data processing apparatus 2, where in some sections of code bypassing the PC match condition would be beneficial, whereas in other sections of code there would not be a benefit. The mode control circuitry 66 enables the ability to activate and deactivate the allocation of bypassing entries for improved training of the prefetcher 40 throughout execution.

Figure 9:
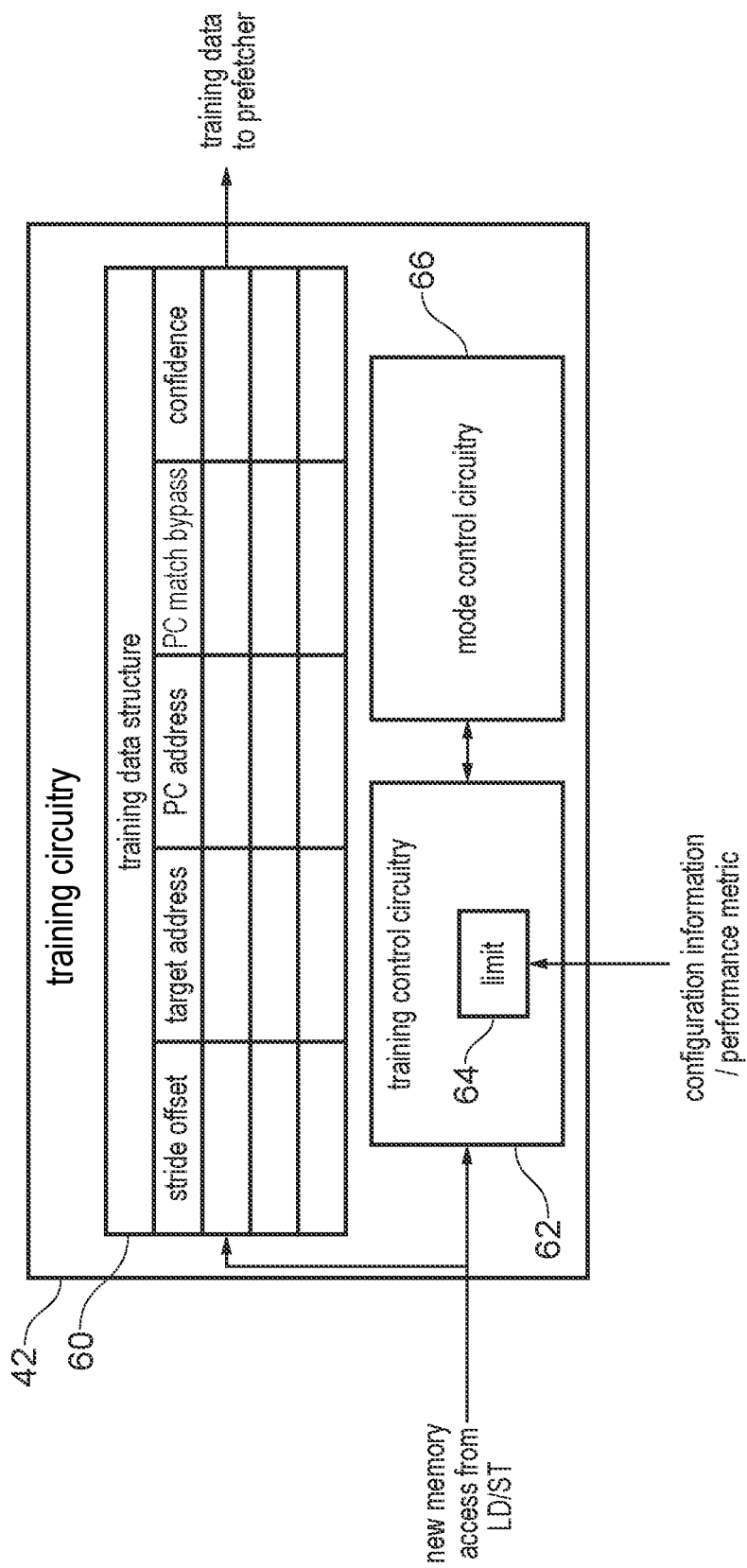
FIG. 9 schematically illustrates training circuitry according to some example embodiments.

FIG. 9 illustrates an example of the training circuitry 42 comprising the training control circuitry 62 and mode control circuitry 66 of previous examples. In this example, the training data structure 60 further includes a confidence value for each entry. The confidence value may be used to indicate a number of memory accesses have been detected for a corresponding tracked stream. Using the example of FIG. 4, entry 0 in state 74 has tracked three memory accesses in the stream. Accordingly, the confidence value may be represented as "+3" in the example of FIG. 9. When generating prefetch requests, the prefetcher 40 may use training data that is of sufficient confidence, for example by comparing the confidence value to a threshold.

Furthermore, in some examples, when a bypassing entry reaches a threshold confidence value (for example, maximum confidence) the bypass indicator is updated to indicate that the PC match condition is not to be bypassed. In other words, a bypassing entry at the threshold confidence value is updated to a non-bypassing entry. This provides a mechanism to effectively override the maximum limit defined by the limit value 64 as described above. In particular, when a bypassing entry reaches the threshold confidence value, the training control circuitry 62 may determine that bypassing the PC match condition is particularly useful for the current section of code being executed. Accordingly, it may be beneficial to allocate additional bypassing entries to the training data structure 60. Therefore, by updating that bypassing entry to a non-bypassing entry, the number of bypassing entries present in the training data structure 60 is reduced by one. The training control circuitry 62, when determining whether to allocate a new entry as a bypassing entry or non-bypassing entry (such as in FIG. 6) will allocate the new entry as a bypassing entry. As step 106 of FIG. 5 does not depend on a PC match condition, even if the PC match bypass is removed from an entry which has reached sufficient confidence, subsequent accesses extending that stream can still continue to update the entry, so once the stream has reached sufficient confidence the PC match bypass is no longer needed. The PC match bypass is most useful in the early stages of starting to train a stream (before it reaches sufficient confidence), when without the PC match bypass an unrolled loop may quickly fill a majority of entries of the training structure with information relating to accesses in a regular stride pattern from different PCs as in the example of FIG. 2, so it is not necessary to continue the PC match bypass once a stream has reached confidence.

Figure 10:
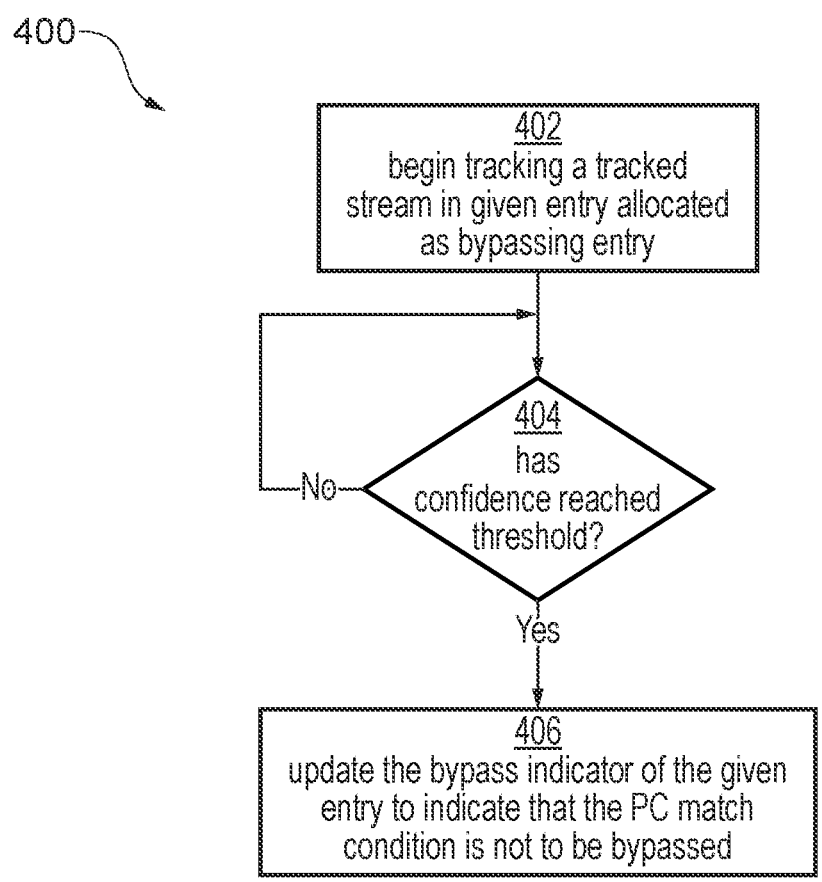
FIG. 10 shows a series of steps for updating the bypass indicator of a given entry based on confidence.

FIG. 10 illustrates a method 400 for managing the confidence value of an entry in the training data structure 60 according to these examples. At step 402, the training control circuitry 62 allocates a bypassing entry to track a tracked stream of memory accesses. At step 404, it is determined whether or not the confidence value of the entry has reached the confidence threshold value. If not (i.e. No at 404) then the bypassing entry is kept as a bypassing entry. However, if the confidence value has reached the threshold (i.e. Yes at 404), then the bypass indicator of the entry is updated to indicate that the PC match condition is not to be bypassed, such that the bypassing entry is updated to a non-bypassing entry. Accordingly, this creates further capacity for additional bypassing entries before reaching the maximum limit set by limit 64.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
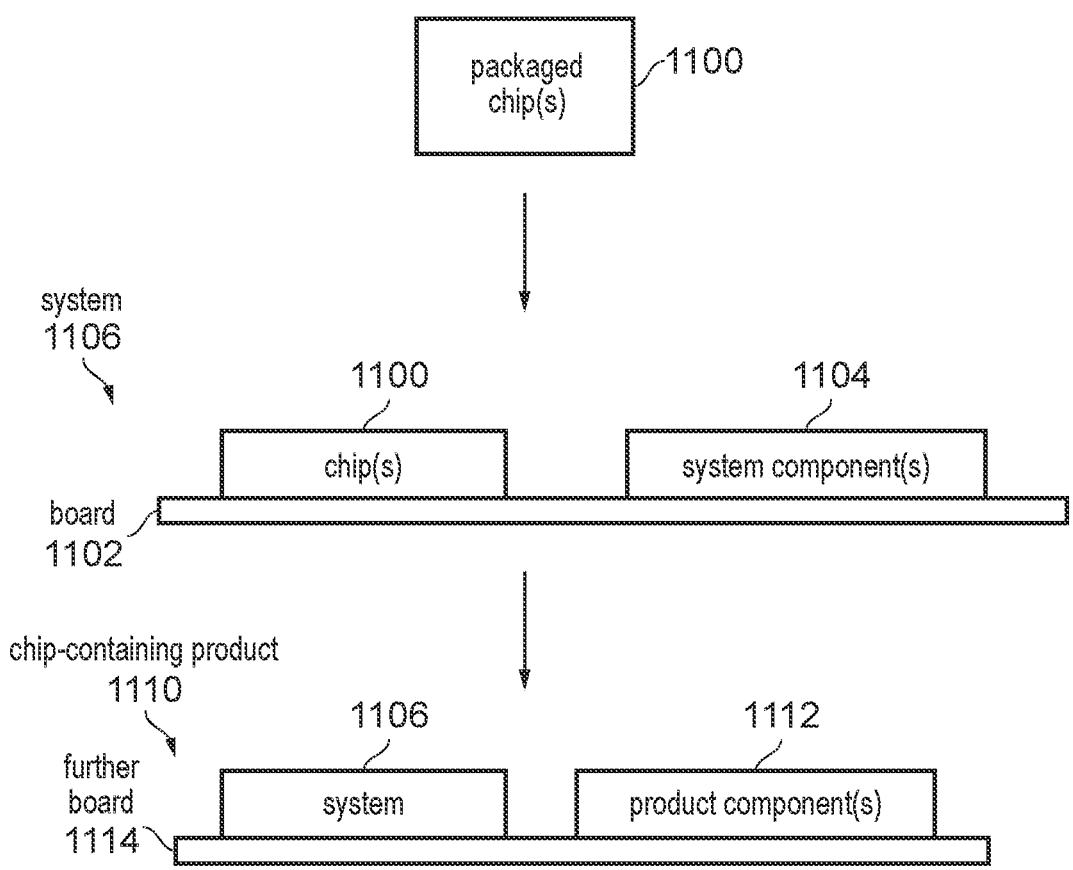
FIG. 11 illustrates a system and chip-containing product according to some example embodiments.

As shown in FIG. 11, one or more packaged chips 1100, with the apparatus described above implemented on one chip or distributed over two or more of the chips, are manufactured by a semiconductor chip manufacturer. In some examples, the chip product 1100 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1100 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1100 are assembled on a board 1102 together with at least one system component 1104 to provide a system 1106. For example, the board may comprise a printed circuit board. The board substrate may be made of any of a variety of materials, e.g. plastic, glass, ceramic, or a flexible substrate material such as paper, plastic or textile material. The at least one system component 1104 comprise one or more external components which are not part of the one or more packaged chip(s) 1100. For example, the at least one system component 1104 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1116 is manufactured comprising the system 1106 (including the board 1102, the one or more chips 1100 and the at least one system component 1104) and one or more product components 1112. The product components 1112 comprise one or more further components which are not part of the system 1106. As a non-exhaustive list of examples, the one or more product components 1112 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1106 and one or more product components 1112 may be assembled on to a further board 1114.

The board 1102 or the further board 1114 may be provided on or within a device housing or other structural support (e.g. a frame or blade) to provide a product which can be handled by a user and/or is intended for operational use by a person or company.

The system 1106 or the chip-containing product 1116 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:
  a training data structure to store a plurality of entries for training a stride prefetcher, a given entry specifying:
    a stride offset for a corresponding tracked stream of memory accesses,
    a target address and a program counter address for a last memory access encountered for the corresponding tracked stream, and
    a bypass indicator indicating whether a program counter match condition is to be bypassed for the given entry; and
  training control circuitry to determine whether to update the stride offset for the given entry of the training data structure to specify a current stride between a target address of a current memory access and the target address for the last memory access of the corresponding tracked stream, wherein:
    in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and in response to the bypass indicator indicating that the program counter match condition is to be bypassed for the given entry, the training control circuitry is configured to determine whether to update the stride offset of the given entry to specify the current stride independent of whether the program counter match condition is satisfied.

(2) The apparatus of clause (1), comprising:
mode control circuitry configured to control the training control circuitry to activate or deactivate a bypassing mode in which a new entry is capable of being allocated to the training data structure with a bypass indicator indicating that the program counter match condition is to be bypassed for the new entry.

(3) The apparatus of clause (2), wherein
the mode control circuitry is configured to control the training control circuitry to deactivate the bypassing mode in response to a determination that confidence in non-bypassing entries of the training data structure is greater than confidence in at least one bypassing entry, the non-bypassing entries comprising the entries for which the bypass indicator indicates that the program counter match condition is not to be bypassed, and the at least one bypassing entry comprising one or more entries for which the bypass indicator indicates that the program counter match condition is to be bypassed.

(4) The apparatus of clause (2) or clause (3), wherein
the mode control circuitry is configured to control the training control circuitry to deactivate the bypassing mode in response to eviction of an evicted entry specifying the bypass indicator indicating that the program counter match condition is to be bypassed.

(5) The apparatus of any of clauses (2) to (4), wherein
the mode control circuitry is configured to control the training control circuitry to reactivate the bypassing mode in response to an update to the stride offset of an updated entry specifying the bypass indicator indicating that the program counter match condition is to be bypassed.

(6) The apparatus of any of clauses (2) to (5), wherein
the mode control circuitry is configured to control the training control circuitry to reactivate the bypassing mode in response to confidence reaching a confidence threshold for a bypassing entry specifying the bypass indicator indicating that the program counter match condition is to be bypassed.

(7) The apparatus of any of clauses (2) to (6), wherein
the mode control circuitry is configured to control the training control circuitry to reactivate the bypassing mode in response to expiration of a predetermined period.

(8) The apparatus of any preceding clause, comprising:
the training control circuitry is configured to determine whether to allocate a new entry to the training data structure specifying a bypass indicator indicating that the program counter match condition is to be bypassed in dependence on a maximum limit on a number of entries specifying a bypass indicator indicating that the program counter match condition is to be bypassed for the new entry.

(9) The apparatus of clause (8), wherein the maximum limit is a static limit.

(10) The apparatus of clause (8), wherein
the training control circuitry is configured to adjust the maximum limit dependent on configuration information indicating an aggressiveness of the stride prefetcher.

(11) The apparatus of any of clauses (8) and (10), wherein
the training control circuitry is configured to dynamically adjust the maximum limit in response to a performance metric of the stride prefetcher.

(12) The apparatus of any preceding clause, wherein
the training control circuitry is configured to determine whether to update the stride offset of the given entry to specify the current stride depending on at least one other condition.

(13) The apparatus of clause (12), wherein
the at least one other condition includes a stride magnitude condition satisfied when a magnitude of the current stride being within a predetermined range.

(14) The apparatus of any preceding clause, wherein
the given entry of the training data structure further specifies a confidence value indicative of the confidence in the corresponding tracked stream; and in response to the confidence value exceeding a confidence threshold for the given entry, the training control circuitry is configured to update the bypass indicator of the given entry to indicate that the program counter match condition is not to be bypassed.

(15) The apparatus of any preceding clause, wherein
the training control circuitry is configured to determine that the program counter match condition is satisfied in response to:
a match between the program counter address for the last memory access and the program counter address associated with the current memory access; or
a match between a hash of the program counter address for the last memory access and a hash of the program counter address associated with the current memory access.

(16) A system comprising:
the apparatus of any preceding clause, implemented in at least one packaged chip;
at least one board system component; and
a board,
wherein the at least one packaged chip and the at least one system component are assembled on the board.

(17) A chip-containing product comprising the system of clause (16) assembled on a further board with at least one other product component.

(18) A method comprising:
storing a plurality of entries for training a stride prefetcher, a given entry specifying:
a stride offset for a corresponding tracked stream of memory accesses,
a target address and a program counter address for a last memory access encountered for the corresponding tracked stream, and
a bypass indicator indicating whether a program counter match condition is to be bypassed for the given entry; and
determining whether to update the stride offset for the given entry to specify a current stride between a target address of a current memory access and the target address for the last memory access of the corresponding tracked stream, wherein:
in response to the bypass indicator indicating that the program counter match condition is not to be bypassed for the given entry, determining whether to update the stride offset of the given entry to specify the current stride depending on a determination of whether the program counter address for the last memory access and a program counter address for the current memory access satisfy the program counter match condition; and in response to the bypass indicator indicating that the program counter match condition is to be bypassed for the given entry, determining whether to update the stride offset of the given entry to specify the current stride independent of whether the program counter match condition is satisfied.

(19) A non-transitory computer-readable medium to store computer-readable code for fabrication of an apparatus comprising:

a training data structure to store a plurality of entries for training a stride prefetcher, a given entry specifying:
  a stride offset for a corresponding tracked stream of memory requests,
  a target address and a program counter address for a last memory access encountered for the corresponding tracked stream, and
  a bypass indicator indicating whether a program counter match condition is to be bypassed for the given entry; and training control circuitry to determine whether to update the stride offset for the given entry of the training data structure to specify a current stride between a target address of a current memory access and the target address for the last memory access of the corresponding tracked stream, wherein:
  in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and
  in response to the bypass indicator indicating that the program counter match condition is to be bypassed for the given entry, the training control circuitry is configured to determine whether to update the stride offset of the given entry to specify the current stride independent of whether the program counter match condition is satisfied.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

a training data structure to store a plurality of entries for training a stride prefetcher, a given entry specifying:
  a stride offset for a corresponding tracked stream of memory accesses,
  a target address and a program counter address for a last memory access encountered for the corresponding tracked stream, and
  a bypass indicator indicating whether a program counter match condition is to be bypassed for the given entry; and training control circuitry to determine whether to update the stride offset for the given entry of the training data structure to specify a current stride between a target address of a current memory access and the target address for the last memory access of the corresponding tracked stream, wherein:
  in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and
  in response to the bypass indicator indicating that the program counter match condition is to be bypassed for the given entry, the training control circuitry is configured to determine whether to update the stride offset of the given entry to specify the current stride independent of whether the program counter match condition is satisfied.

2. The apparatus of claim 1, comprising:

mode control circuitry configured to control the training control circuitry to activate or deactivate a bypassing mode in which a new entry is capable of being allocated to the training data structure with a bypass indicator indicating that the program counter match condition is to be bypassed for the new entry.

3. The apparatus of claim 2, wherein the mode control circuitry is configured to control the training control circuitry to deactivate the bypassing mode in response to a determination that confidence in non-bypassing entries of the training data structure is greater than confidence in at least one bypassing entry, the non-bypassing entries comprising the entries for which the bypass indicator indicates that the program counter match condition is not to be bypassed, and the at least one bypassing entry comprising one or more entries for which the bypass indicator indicates that the program counter match condition is to be bypassed.

4. The apparatus of claim 2, wherein the mode control circuitry is configured to control the training control circuitry to deactivate the bypassing mode in response to eviction of an evicted entry specifying the bypass indicator indicating that the program counter match condition is to be bypassed.

5. The apparatus of claim 2, wherein the mode control circuitry is configured to control the training control circuitry to reactivate the bypassing mode in response to an update to the stride offset of an updated entry specifying the bypass indicator indicating that the program counter match condition is to be bypassed.

6. The apparatus of claim 2, wherein
the mode control circuitry is configured to control the training control circuitry to reactivate the bypassing mode in response to confidence reaching a confidence threshold for a bypassing entry specifying the bypass indicator indicating that the program counter match condition is to be bypassed.

7. The apparatus of claim 2, wherein
the mode control circuitry is configured to control the training control circuitry to reactivate the bypassing mode in response to expiration of a predetermined period.

8. The apparatus of claim 1, comprising:
the training control circuitry is configured to determine whether to allocate a new entry to the training data structure specifying a bypass indicator indicating that the program counter match condition is to be bypassed in dependence on a maximum limit on a number of entries specifying a bypass indicator indicating that the program counter match condition is to be bypassed for the new entry.

9. The apparatus of claim 8, wherein the maximum limit is a static limit.

10. The apparatus of claim 8, wherein
the training control circuitry is configured to adjust the maximum limit dependent on configuration information indicating an aggressiveness of the stride prefetcher.

11. The apparatus of claim 8, wherein
the training control circuitry is configured to dynamically adjust the maximum limit in response to a performance metric of the stride prefetcher.

12. The apparatus of claim 1, wherein
the training control circuitry is configured to determine whether to update the stride offset of the given entry to specify the current stride depending on at least one other condition.

13. The apparatus of claim 12, wherein
the at least one other condition includes a stride magnitude condition satisfied when a magnitude of the current stride being within a predetermined range.

14. The apparatus of claim 1, wherein
the given entry of the training data structure further specifies a confidence value indicative of the confidence in the corresponding tracked stream; and
in response to the confidence value exceeding a confidence threshold for the given entry, the training control circuitry is configured to update the bypass indicator of the given entry to indicate that the program counter match condition is not to be bypassed.

15. The apparatus of claim 1, wherein
the training control circuitry is configured to determine that the program counter match condition is satisfied in response to:
 a match between the program counter address for the last memory access and the program counter address associated with the current memory access; or
 a match between a hash of the program counter address for the last memory access and a hash of the program counter address associated with the current memory access.

16. A system comprising:
the apparatus of claim 1, implemented in at least one packaged chip;
at least one board system component; and
a board,
wherein the at least one packaged chip and the at least one system component are assembled on the board.

17. A chip-containing product comprising the system of claim 16 assembled on a further board with at least one other product component.

18. A method comprising:
storing a plurality of entries for training a stride prefetcher, a given entry specifying:
 a stride offset for a corresponding tracked stream of memory accesses,
 a target address and a program counter address for a last memory access encountered for the corresponding tracked stream, and
 a bypass indicator indicating whether a program counter match condition is to be bypassed for the given entry; and
determining whether to update the stride offset for the given entry to specify a current stride between a target address of a current memory access and the target address for the last memory access of the corresponding tracked stream, wherein:
 in response to the bypass indicator indicating that the program counter match condition is not to be bypassed for the given entry, determining whether to update the stride offset of the given entry to specify the current stride depending on a determination of whether the program counter address for the last memory access and a program counter address for the current memory access satisfy the program counter match condition; and
 in response to the bypass indicator indicating that the program counter match condition is to be bypassed for the given entry, determining whether to update the stride offset of the given entry to specify the current stride independent of whether the program counter match condition is satisfied.

19. A non-transitory computer-readable medium to store computer-readable code for fabrication of an apparatus comprising:
a training data structure to store a plurality of entries for training a stride prefetcher, a given entry specifying:
 a stride offset for a corresponding tracked stream of memory requests,
 a target address and a program counter address for a last memory access encountered for the corresponding tracked stream, and
 a bypass indicator indicating whether a program counter match condition is to be bypassed for the given entry; and
training control circuitry to determine whether to update the stride offset for the given entry of the training data structure to specify a current stride between a target address of a current memory access and the target address for the last memory access of the corresponding tracked stream, wherein:
 in response to the bypass indicator indicating that the program counter match condition is not to be bypassed for the given entry, the training control circuitry is configured to determine whether to update the stride offset of the given entry to specify the current stride depending on a determination of whether the program counter address for the last memory access and a program counter address for the current memory access satisfy the program counter match condition; and
 in response to the bypass indicator indicating that the program counter match condition is to be bypassed for the given entry, the training control circuitry is configured to determine whether to update the stride offset of the given entry to specify the current stride independent of whether the program counter match condition is satisfied.

* * * * *